United States Patent
Tiwari et al.

(10) Patent No.: US 11,501,237 B2
(45) Date of Patent: Nov. 15, 2022

(54) OPTIMIZED ESTIMATES FOR SUPPORT CHARACTERISTICS FOR OPERATIONAL SYSTEMS

(71) Applicant: International Business Machines Corporation, Armonk, NY (US)

(72) Inventors: Pranshu Tiwari, Delhi (IN); Harish Bharti, Pune (IN); Pradeep Dash, Columbus, OH (US); Santosh Patil, Irving, TX (US); Swarnalata Patel, Bangalore (IN); Saurabh Trehan, Delhi (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/984,581

(22) Filed: Aug. 4, 2020

(65) Prior Publication Data
US 2022/0044179 A1    Feb. 10, 2022

(51) Int. Cl.
*G06Q 10/00* (2012.01)
*G06Q 10/06* (2012.01)
(Continued)

(52) U.S. Cl.
CPC ..... *G06Q 10/06375* (2013.01); *G06F 16/288* (2019.01); *G06N 5/02* (2013.01);
(Continued)

(58) Field of Classification Search
None
See application file for complete search history.

(56) References Cited

U.S. PATENT DOCUMENTS

| 7,225,250 B1 | 5/2007 | Harrop |
| 8,365,019 B2 | 1/2013 | Sailer et al. |

(Continued)

FOREIGN PATENT DOCUMENTS

| CA | 3042926 A1 | 11/2019 |
| WO | 2001025970 A1 | 4/2001 |

OTHER PUBLICATIONS

Eichhorn, Garrett, Predict IT Support Tickets with Machine Learning and NLP, Apr. 20, 2020, Towards Data Science, https://towardsdatascience.com/predict-it-support-tickets-with-machine-learning-and-nlp-a87ee1cb66fc, p. 1-15. (Year: 2020).*

(Continued)

*Primary Examiner* — Joseph M Waesco
(74) *Attorney, Agent, or Firm* — Rachel M. Yadlosky

(57) ABSTRACT

A method, system, and computer program product for predicting optimal service characteristics to execute predicted IT tickets. The method may include identifying deployment characteristics for an operational system based on an architecture of the operational system. The method may also include receiving implementation data in response to past incident tickets based on the deployment characteristics. The method may also include identifying relationships within the implementation data. The method may also include predicting a volume of new tickets based on the implementation data and the relationships between the implementation data. The method may also include predicting a resolution time for high severity tickets in the volume of new tickets. The method may also include determining preferred service characteristics based on the volume of the new tickets and the resolution time for the high severity tickets. The method may also include transmitting a recommendation comprising the preferred service characteristics.

20 Claims, 7 Drawing Sheets

(51) Int. Cl.
  *G06F 16/28* (2019.01)
  *G06N 5/02* (2006.01)
  *G06Q 30/00* (2012.01)
  *G06Q 10/10* (2012.01)

(52) U.S. Cl.
  CPC ... *G06Q 10/063112* (2013.01); *G06Q 10/105* (2013.01); *G06Q 30/016* (2013.01)

(56) References Cited

U.S. PATENT DOCUMENTS

| | | | |
|---|---|---|---|
| 10,380,520 | B2 | 8/2019 | Srivastava et al. |
| 10,438,212 | B1 | 10/2019 | Jilani et al. |
| 2016/0036655 | A1 | 2/2016 | Burton et al. |
| 2017/0076296 | A1* | 3/2017 | Hirpara ............ G06Q 10/06316 |
| 2017/0124501 | A1* | 5/2017 | Crabtree ............ H04L 63/0807 |
| 2017/0302540 | A1* | 10/2017 | Monahan ............ H04L 41/5051 |
| 2019/0251487 | A1* | 8/2019 | Srivastava ............ G06N 20/00 |
| 2019/0327324 | A1* | 10/2019 | Buffone ............ H04L 67/564 |
| 2019/0392491 | A1* | 12/2019 | Niemann ............ H04M 3/5315 |
| 2020/0065151 | A1* | 2/2020 | Ghosh ............ G06F 40/30 |
| 2020/0104774 | A1* | 4/2020 | Sun ............ G06Q 10/06393 |
| 2020/0258013 | A1* | 8/2020 | Monnett ............ G06Q 10/06 |
| 2020/0293946 | A1* | 9/2020 | Sachan ............ G06N 5/04 |
| 2020/0372415 | A1* | 11/2020 | Mann ............ G06Q 30/01 |
| 2021/0004706 | A1* | 1/2021 | Riddle ............ G06Q 30/016 |
| 2021/0014136 | A1* | 1/2021 | Rath ............ G06N 20/20 |
| 2021/0092029 | A1* | 3/2021 | Kumar ............ G06Q 10/063112 |
| 2021/0158257 | A1* | 5/2021 | Shepard ............ G06Q 10/20 |
| 2021/0224765 | A1* | 7/2021 | Siddique ............ G06Q 10/10 |
| 2021/0234890 | A1* | 7/2021 | Bansal ............ G06N 3/0445 |

OTHER PUBLICATIONS

Qamili et al., "An Intelligent Framework for Issue Ticketing System based on Machine Learning," 2018 IEEE 22nd International Enterprise Distributed Object Computing Workshop, Oct. 2018, 9 pages https://www.researchgate.net/publication/328991159_.

"A System, Method and Apparatus for Categorization of Service Tickets using Topic Analysis," IP.Com, An IP.com Prior Art Database Technical Disclosure, IP.com No. IPCOM000227833D, IP.com Electronic Publication Date: May 21, 2013, 4 pages, https://priorart.ip.com/IPCOM/000227833.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

US 11,501,237 B2

OPTIMIZED ESTIMATES FOR SUPPORT CHARACTERISTICS FOR OPERATIONAL SYSTEMS

BACKGROUND

The present disclosure relates to information technology (IT) service management and monolithic and cloud-based architectures and, more specifically, to using predicted volumes of IT tickets and times to solve them to help predict optimal service characteristics to execute the predicted IT tickets.

IT service management manages, controls, and regulates IT services that are provided. IT services may include any services provided through systems and technology offered by a company. In some instances, the IT services that are available/offered may be listed in a service catalog. One aspect of IT services may include IT support or IT help. When various systems/technologies are not working properly, IT support may help determine and fix the issue(s). In order for IT support to know that an issue exists, a client (e.g., a user of the system(s)/technology) may submit an incident ticket (or IT ticket) that documents the issue. Through IT support and the various IT services, the issue may be reviewed and fixed once the IT ticket is received.

SUMMARY

The present invention provides a computer-implemented method, system, and computer program product to use predicted volumes of IT tickets and times to solve them to help predict optimal service characteristics to execute the predicted IT tickets. The method may include identifying deployment characteristics for an operational system based on an architecture of the operational system. The method may also include receiving implementation data regarding past implementations in response to past incident tickets based on the deployment characteristics. The method may also include identifying relationships within the implementation data. The method may also include predicting a volume of new tickets based on the implementation data and the relationships between the implementation data. The method may also include predicting a resolution time for high severity tickets in the volume of new tickets. The method may also include determining preferred service characteristics based on the volume of the new tickets and the resolution time for the high severity tickets, where the preferred service characteristics decrease the resolution time. The method may also include transmitting a recommendation comprising the preferred service characteristics. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
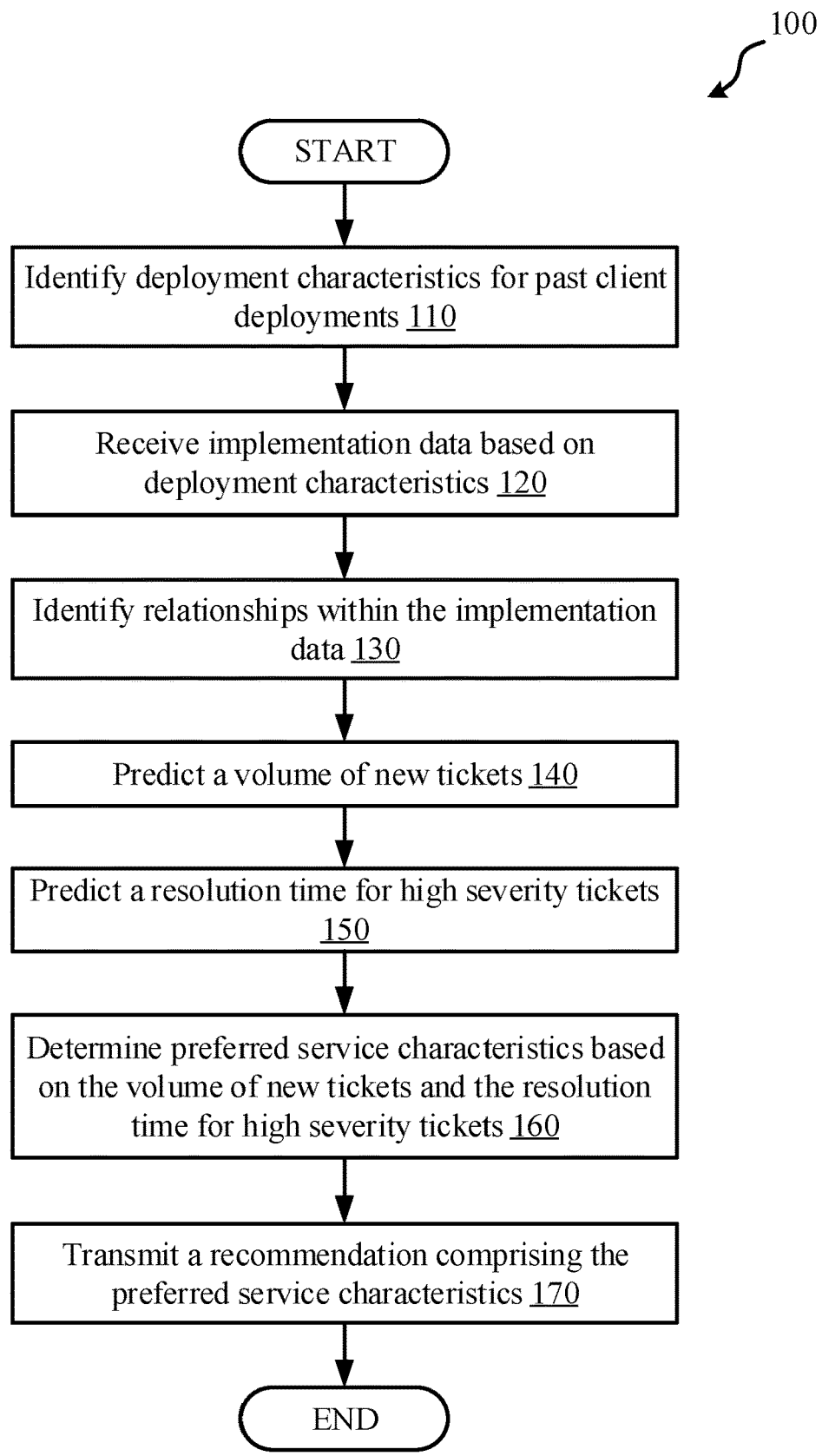
FIG. 1 depicts a flowchart of a set of operations for determining preferred service characteristics for servicing IT tickets, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to information technology (IT) service management and, more specifically, to using predicted volumes of IT tickets and times to solve them to help predict optimal service characteristics to execute the predicted IT tickets. While the present disclosure is not necessarily limited to such applications, various aspects of the disclosure may be appreciated through a discussion of various examples using this context.

Various IT systems and applications may be depended upon in order to run various businesses, companies, etc. Each entity (e.g., business, company, etc.) may have its own data warehouse (a system, such as a database, for storing, analyzing, querying, etc. data from various sources) and operational systems (e.g., business operational systems, business application systems, etc.), which may store large amounts of business and operational data (for example, trillions of bits of data). An operational system may be a system that tracks transactions and events and may process various transactions of an organization. In some instances, an operational system may be within a data warehouse architecture. These systems may be crucial in supporting business operations. For instance, when various business operations (and the applications used to perform said business operations) and/or devices performing those business operations do not work properly, the operational systems may resolve the issue. In some instances, in order for the operational systems to become aware of any issues and/or malfunctions, an IT ticket may be submitted by a client or user. The IT ticket may include a written description of the issue, in some instances. However, in some instances, the entity (or entities) may not have enough bandwidth to promptly respond and resolve the issues of the IT ticket in a timely manner. For instance, when the data warehouse(s) and operational systems are large and complex, there may be a large amount of potential issues that could occur and the solution to resolve the issues may be complex. To resolve this issue, conventional systems have attempted to predict incident tickets. However, for the large and complex data warehouse and operational systems, predicting incident tickets may be difficult and inaccurate due to system integration and various other complexities. Additionally, the problem may intensify with an implementation of a new application such as a commercial off-the-shelf application, an enterprise resource planning (ERP) application, and/or a new cloud-based application. For example, a release of a new application, a new software update, etc. may increase the amount of issues that need to be resolved.

The present disclosure provides a computer-implemented method, system, and computer program product for using predicted volumes of IT tickets and times to solve them. This may help predict optimal service characteristics to execute the predicted IT tickets. For instance, a holistic learning framework may be created to study, analyze, and predict a volume of incident tickets (for example, for a cloud-based platform solution, an on-premises operational system, an off-the-shelf solution, etc.) to identify the optimal service characteristics among resources in order to decrease (or even optimize) a ticket resolution time given a cost constraint of the client(s). Service characteristics may be certain parameters for the service personnel performing the various operations necessary to resolve the IT (or incident) tickets. The optimal service characteristics, as used herein, refer to service characteristics outputted by a machine learning algorithm. In some instances, the optimal service characteristics may be best fit characteristics (i.e., service characteristics that are the best fit for the specific predicted volume of IT tickets and/or resolution times). In some instances, the optimal service characteristics may be improved characteristics (compared to conventional characteristics) that are tailored to the specific predicted volume of IT tickets and/or resolution times.

Once the volume of incident tickets is predicted, necessary resources, skill sets, costs, etc. in order to support newly commissioned applications, newly commissioned software updates, and/or other various IT tickets may be recommended. This may prevent the system from becoming bottlenecked and may increase the efficiency of processing and resolving various IT tickets for the system.

Referring now to FIG. 1, a flowchart illustrating a method 100 for determining preferred service characteristics for servicing IT tickets is depicted, according to some embodiments. In some embodiments, method 100 is executed by a server (e.g., computer system/server 502 (FIG. 5)) on or connected to a computer system (e.g., computer system 500 (FIG. 5)). In some embodiments, the method 100 is implemented as a computer script or computer program (e.g., computer executable code) to be executed on or connected to the computer system. In some embodiments, method 100 is executed on a computer system within a cloud computing environment (e.g., cloud computing environment 50 (FIG. 6)).

Method 100 includes operation 110 to identify deployment characteristics for an operational system. Deployment characteristics may be various factors/characteristics about operations, programs, source code, performance, users, etc. for an operational system. In some embodiments, deployment characteristics include characteristics relating to past incident tickets (and their analysis and resolution (or attempted resolution)) for the operational system. In some embodiments, the deployment characteristics are predetermined and are specific to the system (and operational system) architecture (e.g., monolithic and/or micro services architectures). For instance, various predetermined deployment characteristics may correspond to an on-premises architecture and other various predetermined deployment characteristics (for instance, some similar/the same as and some different from the on-premises architecture deployment characteristics) may correspond to a cloud-based architecture.

Specifically, if the architecture is an on-premises architecture, then the deployment characteristics may include (for instance, all that apply from): a number of business users, a resolution time, a cyclomatic complexity (for instance, a complexity of the program/source code), an elapsed performance time (for instance, a time passed from sending the data for ticket resolution (if the ticket was resolved, then this time may end after receiving the response after the ticket has been resolved)), and a number of integrations (for instance, how many times the system and/or components of the system have been integrated or brought together). If the architecture is a cloud-based architecture, then the deployment characteristics may include: a number of business users, a number of services, a resolution time, a number of containers, a code base, a number of microservice templates (for instance, an amount of service templates for a microservice (cloud-based) architecture), heterogeneous protocols (for instance, protocols, such as routing protocols, between operational systems with significant differences), a number of hypertext transfer protocol (HTTP) operations, the deployment operations (for instance, public, private, hybrid, and/or community deployment), static or dynamic forms (for instance, whether the operations are in a fixed form or an evolving/changing form), a number of technical components of the system, a message architecture (for instance, what type(s) of messaging architectures are being used on the cloud-based system), cloud models, a number of integration systems, and a number of translations (for instance, translating a program to different coding languages).

Therefore, in some embodiments, identifying the deployment characteristics includes identifying an architecture for an operational system and determining the deployment characteristics specific to the architecture for the operational system. In some embodiments, the architecture may be either an on-premises architecture or a cloud-based architecture. In some instances, an on-premises architecture may include a commercial off-the-shelf architecture. Identifying deployment characteristics for past client deployments is discussed further herein and depicted in FIG. 2.

Method 100 includes operation 120 to receive implementation data regarding past implementations in response to past incident (or IT) tickets based on the deployment characteristics. In some embodiments, implementation data may include the past/historical data and any present data regarding past incident tickets. The past data may include information such as the personnel who resolved the issues reported in the incidents (referred to herein as support workers), the time it took to resolve the issues, the methods taken to resolve the issues, what issues were resolved, etc. Implementation data based on the deployment characteristics may be the specific data for the past incident tickets (for example, for the operational system) relating to the identified deployment characteristics. In some embodiments, the implementation data based on the deployment characteristics may be the actual deployment characteristic data for the past incident tickets. Therefore, in some instances, operation 110 may identify which characteristics to gather based on the architecture of the operational system and operation 120 may receive or gather the actual data for the operational system that either is or helps determine the deployment characteristics.

For example, if it is determined that the operational system has a cloud-based architecture, the deployment characteristics may include a number of business users, a number of services, etc. (for example, as depicted in operation 235 of FIG. 2). In this example, the received implementation data (for instance, in response to a request for the data) may include past data about users of the technology (e.g., 100,000 users store their data on cloud server 1) and users who submitted incident tickets (e.g., 2,000 users reported, via incident ticket, that their data is not syncing to the cloud server 1) which may provide implementation data for (or relating to) a number of business users (which is an example deployment characteristic). Additionally, in this example, the received implementation data may include past data about the services that the system is able to provide (for example, through a service catalog) which may provide implementation data relating to a number of services (another deployment characteristic). An example of implementation data about the services that the system is able to provide may be a list of all the services (e.g., device support, virus protection, cloud support, etc.) presented on the incident ticket.

In some embodiments, there may be large amounts of historical data relating to past incident tickets for an operational system. For example, a system may have been operational for 20 years, and there may be information relating to 20 years of past issues and past incident tickets for those issues. Therefore, in some instances, the received implementation data may be limited to a certain time frame. For example, the system may request implementation data from the past year, two years, five years, etc. instead of all available implementation data. In some embodiments, the system submits a request to an operational system for the implementation data and the operational system transmits the implementation data to the system (for example, when the system architecture is a cloud-based architecture). In some embodiments, the operational system is part of the system (for example, when the system architecture is an on-premises architecture).

Method 100 includes operation 130 to identify relationships within the implementation data. In some embodiments, once the implementation data based on (or relating to) the deployment characteristics is received, relationships between the implementation data may be determined. For example, operation 130 may identify relationships between the support workers who resolved (or at least worked on resolving) the IT tickets and the time it took for the resolution to occur (for example, from the point the IT ticket was received to the point a resolution ticket—indicating the IT ticket was resolved—was transmitted to the client/user). In some embodiments, identifying the relationships within the implementation data is done using a correlation matrix. The correlation matrix may show coefficients (for example, probabilities) between variables. For example, a correlation matrix may indicate that a coefficient between two pieces of implementation data (for example, low experience level of a support worker and long resolution time for the incident ticket) to be 0.70. This may indicate that a long resolution time is correlated with 70% of ticket instances that are also correlated with a worker of a low experience level.

Method 100 includes operation 140 to predict a volume of new tickets based on the implementation data and the relationships between the implementation data. In some embodiments, a machine learning algorithm may be used to predict the volume of new tickets. The implementation data (based on the deployment characteristics) for the past implementations may be used as input data and training data for the machine learning algorithm. The machine learning algorithm may output a predicted volume of new tickets that the system may expect to receive. In some embodiments, predicting a volume of new tickets may include analyzing any present (or current) implementation data relating to any existing or upcoming software deployments. For example, there may be code for a new software update. In another example, a new software update may have just been rolled out (for example, to increase a processing speed) and there may be data about the new processing speeds after the software update.

In some embodiments, past implementation data for past deployments that is similar to the present implementation data may be used as input data and/or training data for the machine learning algorithm. For instance, if the client is planning on releasing a new application or a new software update, present data that relates to the future release of the new application and/or software update may be the present implementation data. This data may be inputted into a machine learning algorithm, and the machine learning algorithm may predict that a high volume of new tickets may be expected (due to the new release).

For example, continuing the previous example of present implementation data about a new software update to increase processing speed and the new processing speeds after the software update, the data about a new software update to increase processing speed and the new processing speeds after the software update may be used to determine past implementation data (e.g., data about a past software update and the processing speeds after the past software update). The past implementation data may also include a number of incident tickets that were submitted after the past software update was implemented. The data about the past software update, the processing speeds after the past software update, and the past number of incident tickets may be used to predict a volume of new tickets. For example, the past software update may have doubled the processing speed and, after the software update, 1000 incident tickets may have been submitted. However, in this example, the present implementation data may include that a processing speed only slightly increased after a new software update, therefore it may be predicted that at least 2000 incident tickets may be submitted (due to the minimal increase in processing speed, therefore not significantly improving an issue). Predicting a volume of new tickets is discussed further herein and depicted in FIG. 3.

Method 100 includes operation 150 to predict a resolution time for high severity tickets. The resolution time is the time to resolve the tickets. In some embodiments, once the volume of new tickets is predicted, the machine learning algorithm may predict how many of those new tickets may be high severity tickets. In some embodiments, past implementation data may be used to determine a volume of high severity tickets. For instance, the amount of high severity tickets for similar past deployments may be used to predict the volume of high severity tickets. In some instances, the implementation data for similar past deployments may be analyzed (e.g., for trends, etc.), and, based on the analysis, an amount of high severity tickets for similar past deployments may be determined. The past amounts of high severity tickets (and, in some instances, other data relating to these past high severity tickets) may be used to predict how many new tickets may be high severity tickets.

For example, continuing the previous example of a past software update that doubled the processing speed, the past software update may have resulted in 300 high severity tickets (out of the 1000 total incident tickets). In this example, there may be another past software update that only increased the processing speed by 1.5, and it may have resulted in 500 high severity tickets and 1500 total incident tickets. When analyzing the past software updates, a trend that lesser increases in processing speed (from the software updates) increases the amount of high severity tickets may be discovered. Further, the processing speed may have been doubled in a first software update and then increased by 1.5 in a second software update (for example, more recently). In this example, there may have been a third software update (more recent than the second software update) that increased the processing speed by 1.25. Therefore, there also may be a trend that the processing speed is being increased by lesser amounts in recent software updates. In this example, it may be predicted that a future update may only increase the processing speed by a lesser amount, which, based on the example trend above, may increase the amount of high severity tickets. Therefore, it may be predicted that there may be approximately 700 high severity tickets (in some instances, it may also be predicted that there will be approximately 1800 total incident tickets).

High severity tickets may be IT tickets that include larger issues, urgent issues, more complex issues, or any combination of the three. Put simply, high severity tickets may be IT tickets that need to be resolved in a prompt and timely manner in order to prevent larger problems/issues from occurring. The resolution time for high severity tickets, as opposed to the resolution time for the entire volume of predicted tickets, may be determined because the high severity tickets may have the largest impact on the efficiency of resolving the IT tickets. For example, the resolution time for relatively simple IT tickets may have some variation, but may not have a large enough variation to significantly impact the efficiency of resolving the issues (for example, 20 minutes compared to 30 minutes). Alternatively, large/complex IT tickets may take hours and/or days to resolve (in some instances) and may have a significantly larger variation in possible resolution times.

In some embodiments, predicting the resolution time for the high severity tickets includes identifying factors related to past IT tickets. These factors may include at least a time (an average time spent on an incident ticket), a skill set (an amount of different skills a support worker has), qualification (a level indicating how qualified a support worker is (in some instances, based on skill sets, experience, etc.; in some instances, independent of skill sets, experience, etc.) to resolve a specific incident ticket (or a specific technology area of incident tickets), experience (years of experience that a support worker has had), and cost (salary, hourly wage, etc.)) of each support worker employed by a client. These factors, in some embodiments, may be identified using the implementation data and the relationships between the implementation data (for example, from the correlation matrix). For example, there may be implementation data that Jane (a support worker) has worked on incident tickets relating to virus protection for the past 10 years. Therefore, in this example, Jane may have 10 years of experience (a factor related to past incident tickets). In some embodiments, the factors related to past IT tickets may be laid out in a visual representation (for example, a scatter plot (such as the scatter plot(s) depicted in FIG. 4)) to show the relationship between the various factors of the support workers in regard to their past implementations (i.e., work and resolution on previous IT tickets).

In some embodiments, predicting the resolution time may further include determining a mean (or average) resolution time for the support workers employed by a client, based on the rate, the skill set, the qualification, and the experience of each of the support workers. For instance, an average time that each individual support worker is predicted to spend solving an average ticket may be found, and then a mean resolution time may be calculated using the resolution times for each support worker. In some embodiments, the resolution time may be a general resolution time to resolve an average IT ticket rather than a resolution time specific to high-severity tickets.

Method 100 includes operation 160 to determine preferred service characteristics based on the volume of new tickets and the resolution time for high severity tickets. In some embodiments, the preferred service characteristics minimize the resolution time. In some embodiments, the preferred service characteristics are optimal service characteristics. In some instances, the optimal service characteristics may be best fit characteristics (i.e., service characteristics that are the best fit for the specific predicted volume of IT tickets and/or resolution times). In some instances, the optimal service characteristics may be improved characteristics (compared to conventional characteristics) that are tailored to the specific predicted volume of IT tickets and/or resolution times.

In some embodiments, the preferred service characteristics include at least a cost, experience, and skill set of a candidate support worker. In some embodiments, the preferred service characteristics further include a time and qualification of a candidate support worker. Support workers may be the specific workers that perform the analysis and work on resolving the IT tickets. A candidate support worker may be a support worker that is being considered as a candidate to work on a ticket.

Figure 4:
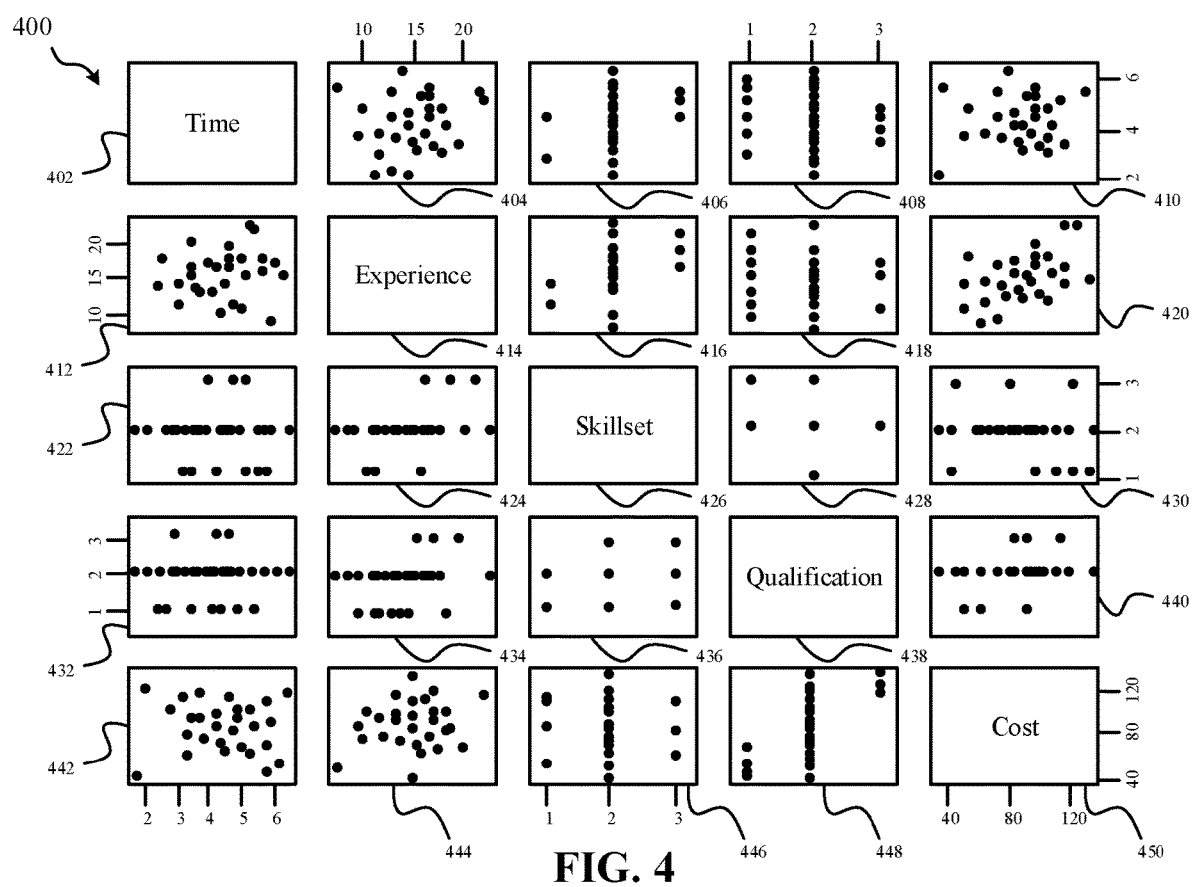
FIG. 4 depicts a schematic diagram of service characteristic scatter plots, according to some embodiments.

In some embodiments, determining the preferred service characteristics may include analyzing the service characteristics for past support workers who performed work on similar volumes of IT tickets and/or levels of high severity tickets. Instead of analyzing all service characteristics for all past support workers, only support workers who have worked on similar amounts of IT tickets and/or similar complexities of IT tickets may be analyzed. In some embodiments, as discussed herein, various service characteristics for past support workers may be displayed in a visual representation (for example, a scatter plot such as depicted in FIG. 4).

In some embodiments, method 100 may include determining an estimated percentage of high severity tickets from the predicted volume of new tickets. This may help determine not only the amount of predicted high severity tickets, but how likely, or probable, it is that the predicted tickets will be a high severity ticket. As discussed above, high severity tickets may have a larger effect on the efficiency of resolving volumes of IT tickets in a timely manner. Therefore, if a large amount of IT tickets (from the predicted volume of IT tickets) are predicted to be high severity, it may be crucial to accurately predict preferred service characteristics in order to best resolve the predicted IT tickets in a timely manner.

In some embodiments, determining the preferred service characteristics may further be based on the probability of high severity tickets. The probability of high severity tickets may be included as another factor to consider and be weighted against the other factors. For instance, if the percentage or probability of high severity tickets is relatively low, the cost service characteristic may have a preferred range of $40-$70 (for example, per day). The lower range of cost may result in a slightly longer resolution time (on average), but in an instance where there is a relatively low probability of high severity tickets, the detriment of a slightly longer resolution time may be outweighed by the benefits of the lower cost. However, in some instances, the percentage or probability of high severity tickets may be relatively high, meaning that there may be a larger number of IT tickets with more complex and/or more urgent issues to resolve. In these instances, the cost service characteristic may have a preferred range of $80-$120 (higher than the example range above) due to the higher chance of high severity tickets. In other words, less expensive support workers may resolve IT tickets quicker when those tickets have a low severity, but as the ticket severity increases, more expensive workers may start resolving IT tickets quicker (than those who are less expensive). Therefore, when there are larger probabilities of high severity tickets, more expensive support workers may be chosen. In some embodiments, data structures such as a binary tree, binary search tree, hashing, and/or trie (digital tree and/or prefix tree) may be used to determine the preferred service characteristics. Determining the preferred service characteristics may be discussed further herein in relation to FIG. 4.

Method 100 includes operation 170 to transmit a recommendation comprising the preferred service characteristics. The preferred service characteristics may be characteristics such as resolution time, experience level, skillset, qualification level, and cost (for example, salary) of support worker(s). In some embodiments, the preferred service characteristics may include information about the recommended resources, such as equipment used. Transmitting the recommendation may include sending a recommendation of the various preferred service characteristics to a user interface (visible by the support workers or a supervisor of the support workers) so that the correct support workers with the necessary service characteristics (matching, or most similar to, the preferred service characteristics) perform the work in order to resolve the IT tickets.

For example, the preferred characteristics may be a resolution time of 2 hours, an experience level of 15 years, a skillset level of 2, a qualification level of 3, and a cost of approximately $70 salary (per day, for example). The skillset level of 2 may indicate that the support worker has a moderate range of skills that they are versed in. The qualification level of 3 may indicate that the support worker is very qualified for the specific type of IT ticket issue, even if they do not have a large range of overall skills (as indicated by the skillset level). For example, a support worker may be very well versed in debugging and may have a high qualification level for debugging related IT tickets. In this example, the support worker may not have skills in areas other than debugging, however, and therefore may have a low skillset level. In another example, there may be minimal trends to the received IT tickets (in other words, there may not be multiple tickets in a same skillset), therefore a skillset of 3 may be preferred. These characteristics may be transmitted to a user interface and may be used to select one or more support workers that meet the preferred characteristics.

In some instances, the preferred characteristics that are recommended may be optimized resources based on the skills, cost, and/or experience of the support worker. The preferred service characteristics may also consider a budget, or budget range, of a client. For instance, the client may only have a certain budget they are able to put towards their ticket resolution and support workers. Therefore, in some instances, determining the preferred characteristics and recommending certain characteristics may include creating an objective function (for example factoring in the client's budget) that may be minimized in order to reduce, or stay within, a client's budget. In some embodiments, the objective function may be convex and may be a function of at least skill set, experience, and cost. The function may be minimized using a gradient search method. In some instances, algorithms such as a gradient search method, a minima/maxima function (e.g., for continuous functions), a multi-start approach (e.g., to minimize cost, qualification, and/or skillset), etc. may be used to determine preferred service characteristics that can be transmitted as a recommendation. The recommended service characteristics, or the preferred service characteristics, may be transmitted, for example, to the client so the client can assign support workers with the preferred and recommended service characteristics to perform the IT ticket resolution, in some instances.

Figure 2:
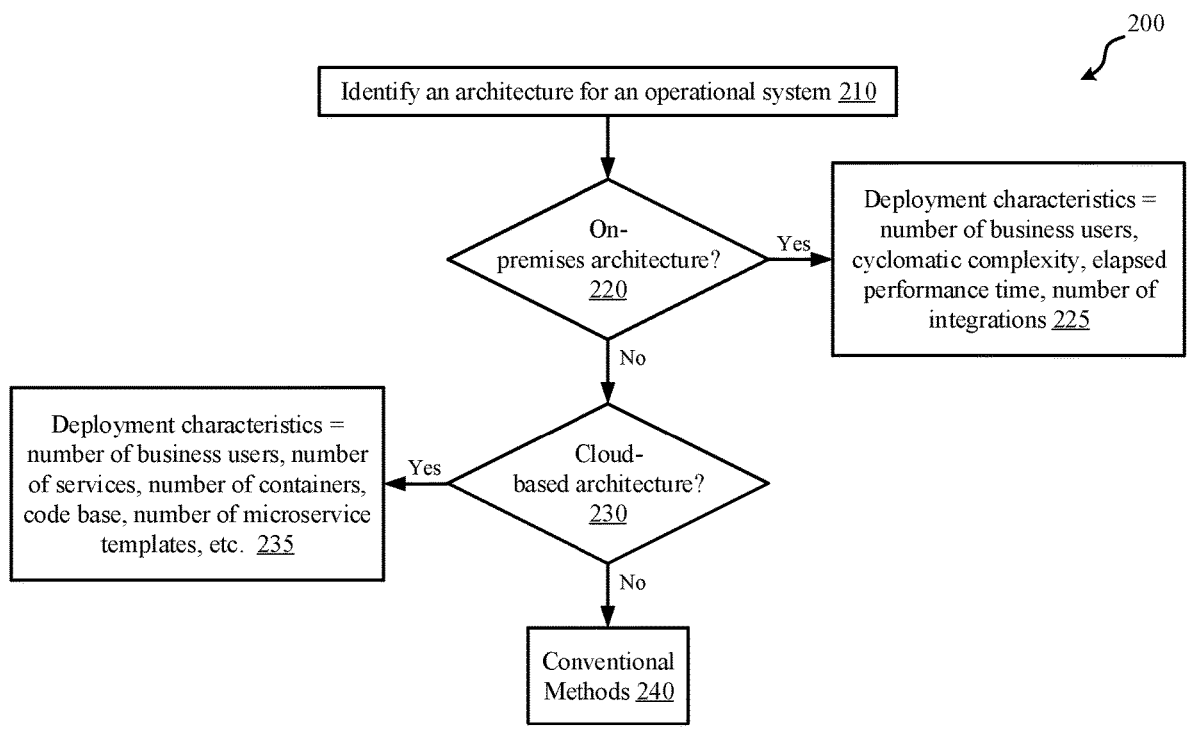
FIG. 2 depicts a flowchart of a set of operations for identifying deployment characteristics, according to some embodiments.

Referring to FIG. 2, a flowchart of a method 200 for identifying deployment characteristics is depicted, according to some embodiments. In some embodiments, method 200 corresponds to operation 130 of FIG. 1.

Method 200 includes operation 210 to identify an architecture of an operational system. As discussed herein, the architecture may be an on-premises architecture or a cloud-based architecture. Method 200 includes operation 220 to determine whether the architecture is an on-premises architecture. If the architecture is an on-premises architecture, then the set of deployment characteristics to consider is: a number of business users, a resolution time, a cyclomatic complexity (for instance, a complexity of the program/source code), an elapsed performance time (for instance, a time passed from sending the data for ticket resolution (if the ticket was resolved, then this time may end after receiving the response after the ticket has been resolved), and a number of integrations (for instance, how many times the system and/or components of the system have been integrated or brought together) (operation 225).

If the architecture is not an on-premises architecture (in operation 220), then method 200 may proceed to operation 230 to determine whether the architecture is a cloud-based architecture. If the architecture is a cloud-based architecture, then the set of deployment characteristics to consider is: number of business users, a number of services, a resolution time, a number of containers, a code base, a number of microservice templates (for instance, an amount of service templates for a microservice (cloud-based) architecture), heterogeneous protocols (for instance, protocols, such as routing protocols, between operational systems with significant differences), a number of hypertext transfer protocol (HTTP) operations, the deployment operations (for instance, public, private, hybrid, and/or community deployment), static or dynamic forms (for instance, whether the operations are in a fixed form or an evolving/changing form), a number of technical components of the system, a message architecture (for instance, what type(s) of messaging architectures are being used on the cloud-based system), cloud models, a number of integration systems, and a number of translations (for instance, translating a program to different coding languages) (operation 235). If the architecture is not a cloud-based architecture, method 200 may proceed to operation 240 and may execute conventional methods of resolving IT tickets. In some embodiments, such a system (i.e., not could-based and not on-premises) may not exist. In some instances, the cloud-based architecture may have more possible deployment characteristics than the on-premises architecture, because the cloud-based architecture may be more complex and may include more components. For example, the cloud-based architecture may include components not just from the company (or client) resolving the specific IT tickets, but it may include components for a variety of other clients who subscribe to the same architecture.

Figure 3:
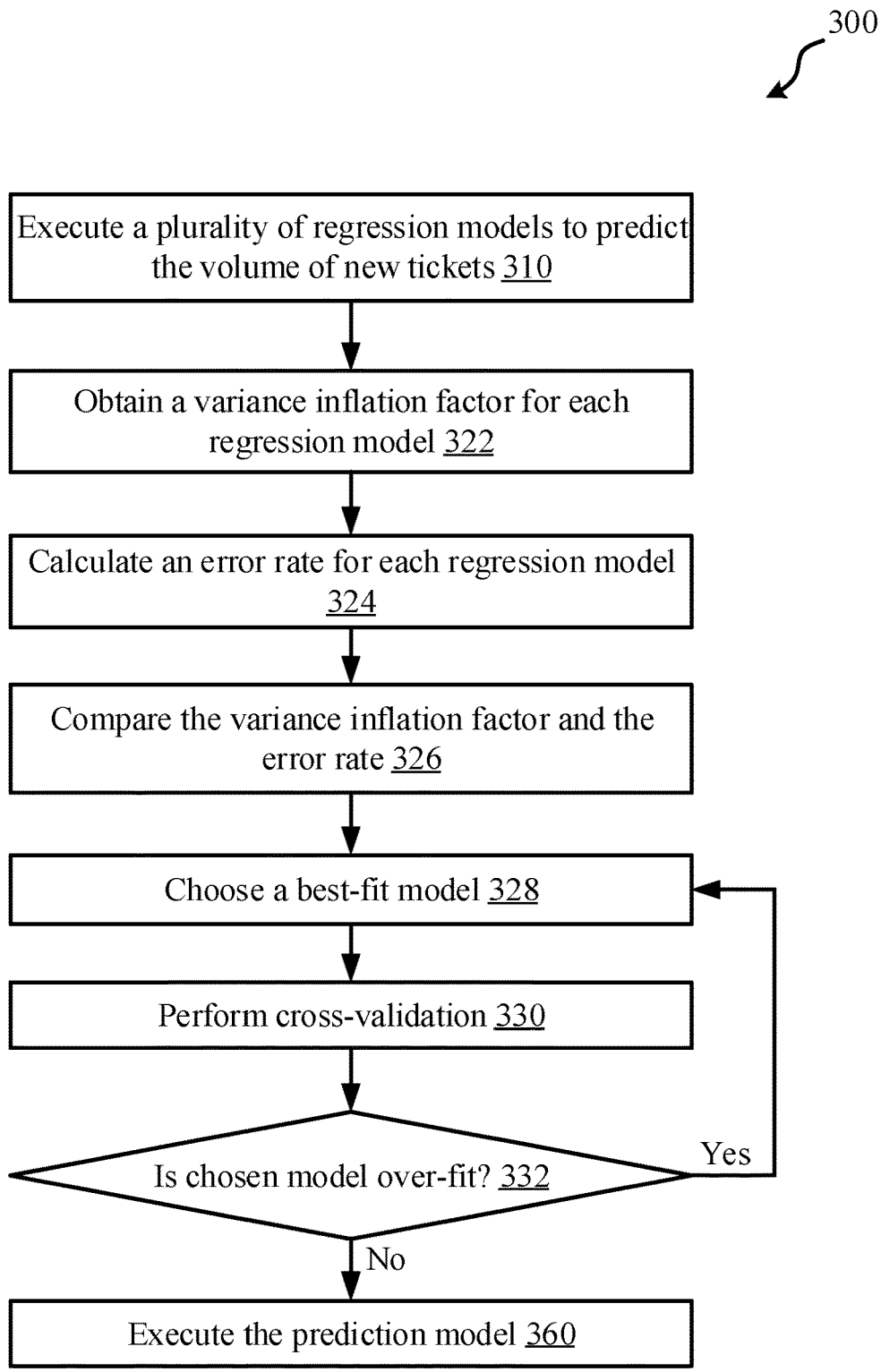
FIG. 3 depicts a flowchart of a set of operations for predicting a volume of new tickets, according to some embodiments.

Referring to FIG. 3, a flowchart of a method 300 for predicting a volume of new tickets (including determining a prediction model to use) is depicted, according to some embodiments. In some embodiments, method 300 corresponds to operation 140 of FIG. 1.

Method 300 includes operation 310 to execute a plurality of regression models to predict the volume of new tickets. A regression model may be a predictive model that looks at the relationships between a dependent variable and various independent variables. Some example regression models include linear regression, log linear regression, penalized/ridge regression, and a generalized additive model. In some embodiments, executing a plurality of regression models includes executing one or more of the example regression models using the deployment characteristics. In some embodiments, all available regression models for the system (for example, that are capable of being executed using the system's machine learning capabilities) may be executed. To execute the plurality of regression models, the implementation data based on the deployment characteristics for the specific system architecture may be used, in some embodiments.

Method 300 includes obtaining a variance inflation factor for each regression model from the plurality of regression models (operation 322). A variance inflation factor is a factor indicating how much linear relation, or multicollinearity, there is between variables in a regression model. If variables are linearly related to each other, then anything that happens to one variable may affect the second variable, which may greatly affect the accuracy of the regression model. Therefore, if there is too much multicollinearity, the amount of variance (i.e., how far the data differs from each other or how spread apart the data is) there is for the regression model may increase or inflate. In some instances, the more variance there is for the model, the less the model fits the data. Therefore, in some instances, the lowest variance inflation factor may indicate the model with the least amount of multicollinearity and the best fit for the data. In some embodiments, machine learning capabilities are used to obtain the variance inflation factor for each model.

Method 300 includes calculating an error rate for each regression model (operation 324). An error rate, or simply error, for a regression model may indicate how much the predicted values differ from the regression line (or the best fit line). For example, using scatter plot 420 from FIG. 4, if a regression model was determined to be from approximately the bottom left corner of the plot to the top right corner of the plot, but the value predicted using the model (e.g., by inputting implementation data based on the deployment characteristics) would fit in the top left corner of plot 420 (very different from other data depicted in plot 420 and opposite a model going from the bottom left to the top right of the plot 420), the model for plot 420 may have a large error rate as the predicted value differed significantly from the model. In some instances, calculating the error rate may be done using root mean squared error (RMSE), relative squared error (RSE), mean absolute error (MAE), relative absolute error (RAE), etc.

Method 300 includes comparing the variance inflation factor and the error rate for each regression model (operation 326). In some embodiments, the variation inflation factor and the error rate may be consistent for the models. For example, the same model may have a large variance inflation factor and a large error rate, indicating that the model is not a good fit for the specific data. In another example, the same model may have the smallest variance inflation factor and the smallest error rate (compared to the other regression models), and therefore may be the preferred regression model. In some embodiments, the variance inflation factor and the error rate may not be consistent. For example, one model may have a small variance inflation factor (indicating that the variables of the model are not linearly dependent) but a large error rate (indicating that there is a large error between the predicted data points and the regression line (which is the best fit line of the predicted data points)). The previous example above about scatter plot 420 (FIG. 4) and an example predicted value in the top left corner of the plot may have a smaller variance inflation factor (assuming the model has minimal to no multicollinearity) but a large error rate.

Method 300 includes operation 328 to choose a best-fit model. In some embodiments, choosing the best-fit model is based on the variance inflation factor for each regression model (from operation 322), the error rate for each regression model (operation 324), and the comparison of the variance inflation factor and the error rate (operation 326). In some instances, the best-fit model may be the regression model (from the plurality of regression models) with a lowest error rate. In some instances, the best-fit model may be the regression model with a combination of a low error rate and a low variance inflation factor.

Method 300 further includes operation 330 to perform cross-validation on the best-fit model. Cross-validation may be performed to help prevent over-fitting of the regression model. In some instances, the model may be too fit to the data to the point that it may lose its initial purpose. For example, the model may go through every data point, but may no longer be a straight line (in an instance where the model should be a straight line). For example, using again scatter plot 420 from FIG. 4, a preferred regression model of ridge regression may have been determined. However, in this example, the ridge regression model may zig-zag through a large amount of the data points, resulting in a non-linear model touching a large amount of data points on plot 420. This example model may be very complex and may be over-fit to the specific data points, such that it may be extremely inaccurate for any data that is not the data points on plot 420. The cross-validation of operation 330 may determine that the preferred regression model of ridge regression is over-fitted to the specific data and should not be used (due to its inaccuracy for any other data).

Method 300 includes operation 332 to determine whether the chosen best-fit model is over-fit based on the cross-validation. In some embodiments, this includes analyzing the cross-validation results compared to the best-fit model. For example, it may be determined that the best-fit model is over-fit. If this is the case, method 300 may go back to operation 328 and determine a new best-fit model. In some instances, determining a new best-fit model (by returning to operation 328) may include selecting the second best model (for instance, the model that was runner-up for being the best-fit model) as the new best-fit model. For instance, continuing the above example, the preferred regression model of ridge regression may be determined to be over-fit during the cross-validation, therefore runner-up model of linear regression (in this example) may be selected as the prediction model. In some embodiments, the cross-validation may further be performed on the second best model before it is selected to be the prediction model (in operation 340). In some instances, when the chosen best-fit model is not over-fit, the best-fit model is selected as the prediction model.

If the best-fit model is determined to not be over-fit (in operation 332), method 300 proceeds to operation 360 to execute the prediction model. The model may be executed, in some embodiments, using machine learning capabilities. The output of the prediction model may be the predicted volume of new tickets.

Referring to FIG. 4, a schematic diagram of service characteristic scatter plots 400 is depicted, according to some embodiments. The scatter plots 400 may include a plurality of scatter plots depicting service characteristics and service characteristic data for various past support workers. Each dot on the scatter plots 400 may represent a support worker resolving an incident ticket. For instance, a dot on scatter plot 412 may represent a resolution time for a support worker to resolve the incident ticket and an experience level of the support worker who resolved the incident ticket. In example scatter plots 400, the service characteristics include time 402, experience 414, skillset 426, qualification 438, and cost 450. As the scatter plots 400 have two axes, each scatter plot 400 may show a relationship between two service characteristics. For example, scatter plots 404 and 412 show the relationship between the time and experience characteristics; scatter plots 406 and 422 show the relationship between the time and skillset characteristics; scatter plots 408 and 432 show the relationship between the time and qualification characteristics; and scatter plots 410 and 442 show the relationship between the time and cost characteristics. Further, scatter plots 416 and 424 show the relationship between experience and skillset; plots 418 and 434 show the relationship between experience and qualification; and plots 420 and 444 show the relationship between experience and cost. Plots 428 and 436 show the relationship between skillset and qualification; plots 430 and 446 show the relationship between skillset and cost; and plots 440 and 448 show the relationship between qualification and cost.

Each plot may correspond to different sets of incident tickets, in some embodiments. In some embodiments, the horizontal plots for each of the service characteristics may correspond to one set of incident tickets (and their corresponding support workers) and the vertical plots may correspond to a second set of incident tickets. For example, plots 404, 406, 408, and 410 may correspond to a first set of support workers/incident tickets and plots 412, 422, 432, and 442 may correspond to a second set of support workers/incident tickets. Continuing the example, plots 404, 424, 434, and 444 may correspond to a set of support workers/incident tickets and plots 412, 416, 418, and 420 may correspond to a different set of support workers/incident tickets.

In this example set of plots 400, both plots 404 and 412 show that there is not much correlation between the time spent resolving the IT ticket and the experience level of the support worker. The times spent on IT tickets (depicted on the scatter plots 400) may range between 2 and 6 hours and the experience levels of the support workers range between 0 to approximately 25 years of experience.

Additionally, in this example, the skillset may range between levels 1, 2, or 3 (with 3 being the highest level skillset (for example with the most skills) and 1 being the lowest level skillset). Plots 406 and 422 may indicate that a middle skillset level 2 has a large range of resolution times. In plot 422, the lower skillsets appear to also be a relatively wide range of resolution times and the high skillsets (level 3) are all around a 3-5 hour resolution time. Plot 406 appears to have resolution times of around 4-6 hours for level 3 skillsets, differing slightly from plot 422 (due to a different dataset with different incident tickets/support workers). The higher resolution times for the higher skillsets may have occurred for a variety of reasons. For instance, the higher skillsets may handle more complex IT tickets that may take longer to resolve.

Both plots 432 and 408 show that medium qualifications (level 2) have a large variety of resolution times for the IT tickets. The qualification level may indicate how qualified a support worker is (for example, how much experience, education, etc. a support worker has) to resolve a specific incident ticket. There may also be a variety of resolution times for low qualifications (level 1), however the resolution times are slightly more concentrated on the mid (or even high for plot 408) resolution time. The highest qualifications (level 3) appear to have the lowest resolution times (compared to the other qualification levels).

When determining the preferred service characteristics, similar analyses may occur for each scatter plot 402-450. Then the various scatter plots and their corresponding analyses may be compared, in order to determine the preferred service characteristics. For example, when looking at plot 406 alone, it may appear that support workers with the lowest skillsets solve problems faster than workers with higher skills, and therefore the preferred service characteristic should be low (e.g., level 1) skillsets. However, plots 416 and 424 show that workers with higher level skillsets typically have more experience and plots 430 and 446 show that workers with lower level skillsets can sometimes cost more (for example, a support worker may have a limited number of skills, but may be extremely qualified and may have a large amount of experience with their limited skills). Therefore, the plots, when looked at in their entirety, may help determine the best combination of service characteristics to resolve the incident ticket(s). For example, it may be determined that the preferred service characteristics are a resolution time of 4 hours, an experience level of around 12-15 years, a skillset of 2, a qualification level of 2 or 3, and a cost of approximately $60-$90.

Figure 5:
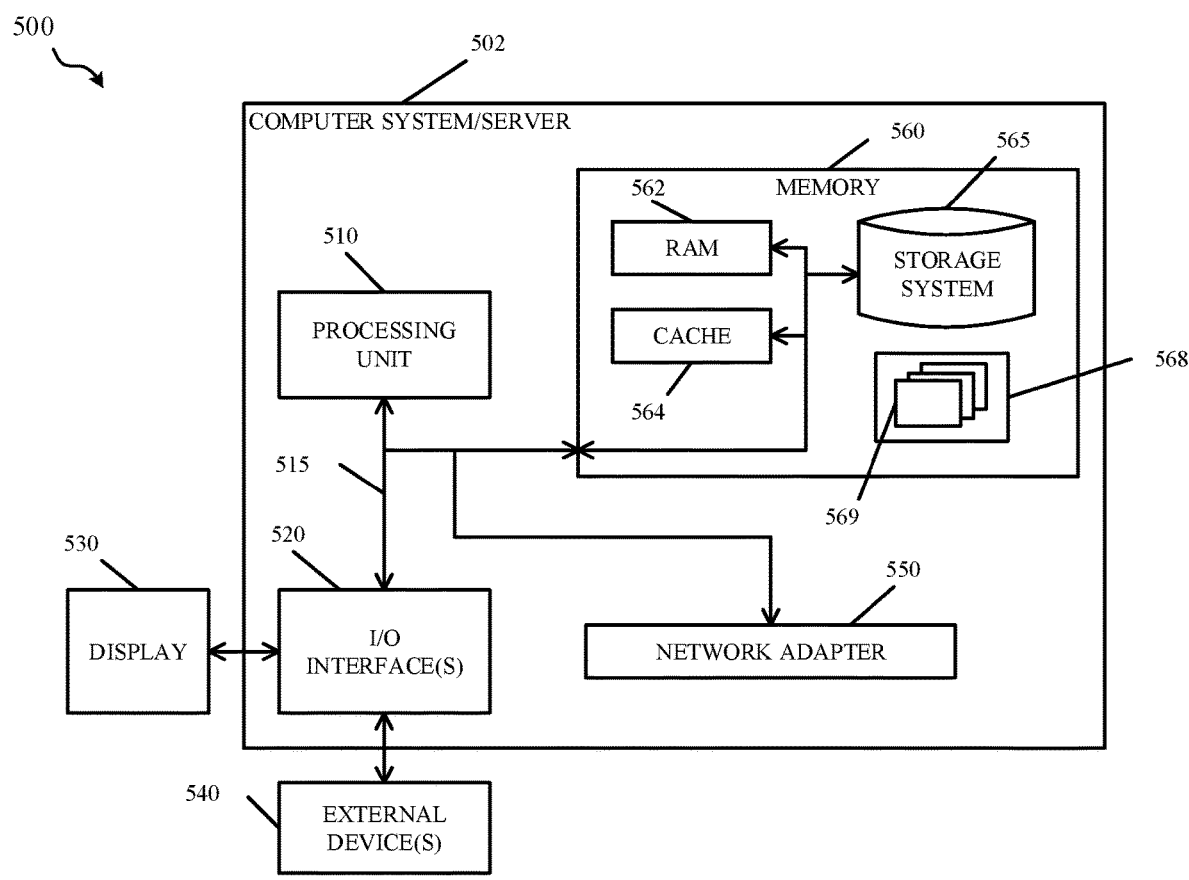
FIG. 5 depicts a block diagram of an example computer system environment, according to some embodiments.

Referring to FIG. 5, computer system 500 is a computer system/server 502 is shown in the form of a general-purpose computing device, according to some embodiments. In some embodiments, computer system/server 502 is located on the linking device. In some embodiments, computer system 502 is connected to the linking device. The components of computer system/server 502 may include, but are not limited to, one or more processors or processing units 510, a system memory 560, and a bus 515 that couples various system components including system memory 560 to processor 510.

Bus 515 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 560 can include computer system readable media in the form of volatile memory, such as random-access memory (RAM) 562 and/or cache memory 564. Computer system/server 502 may further include other removable/non-removable, volatile/non-volatile computer system storage media. By way of example only, storage system 565 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 515 by one or more data media interfaces. As will be further depicted and described below, memory 560 may include at least one program product having a set (e.g., at least one) of program modules that are configured to carry out the functions of embodiments of the disclosure.

Program/utility 568, having a set (at least one) of program modules 569, may be stored in memory 560 by way of example, and not limitation, as well as an operating system, one or more application programs, other program modules, and program data. Each of the operating system, one or more application programs, other program modules, and program data or some combination thereof, may include an implementation of a networking environment. Program modules 569 generally carry out the functions and/or methodologies of embodiments of the invention as described herein.

Computer system/server 502 may also communicate with one or more external devices 540 such as a keyboard, a pointing device, a display 530, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 520. Still yet, computer system/server 502 can communicate with one or more networks such as a local area network (LAN), a general wide area network (WAN), and/or a public network (e.g., the Internet) via network adapter 550. As depicted, network adapter 550 communicates with the other components of computer system/server 502 via bus 515. It should be understood that although not shown, other hardware and/or software components could be used in conjunction with computer system/server 502. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
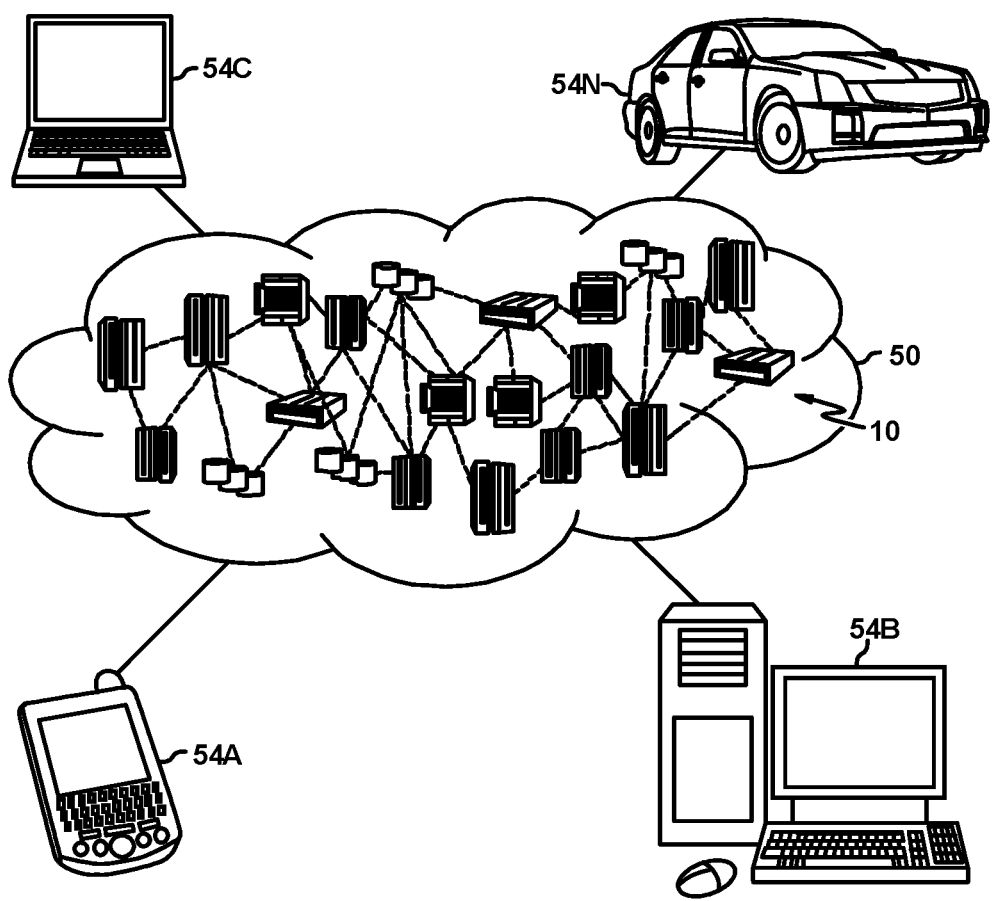
FIG. 6 depicts a cloud computing environment, according to some embodiments.

Referring now to FIG. 6, illustrative cloud computing environment 50 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
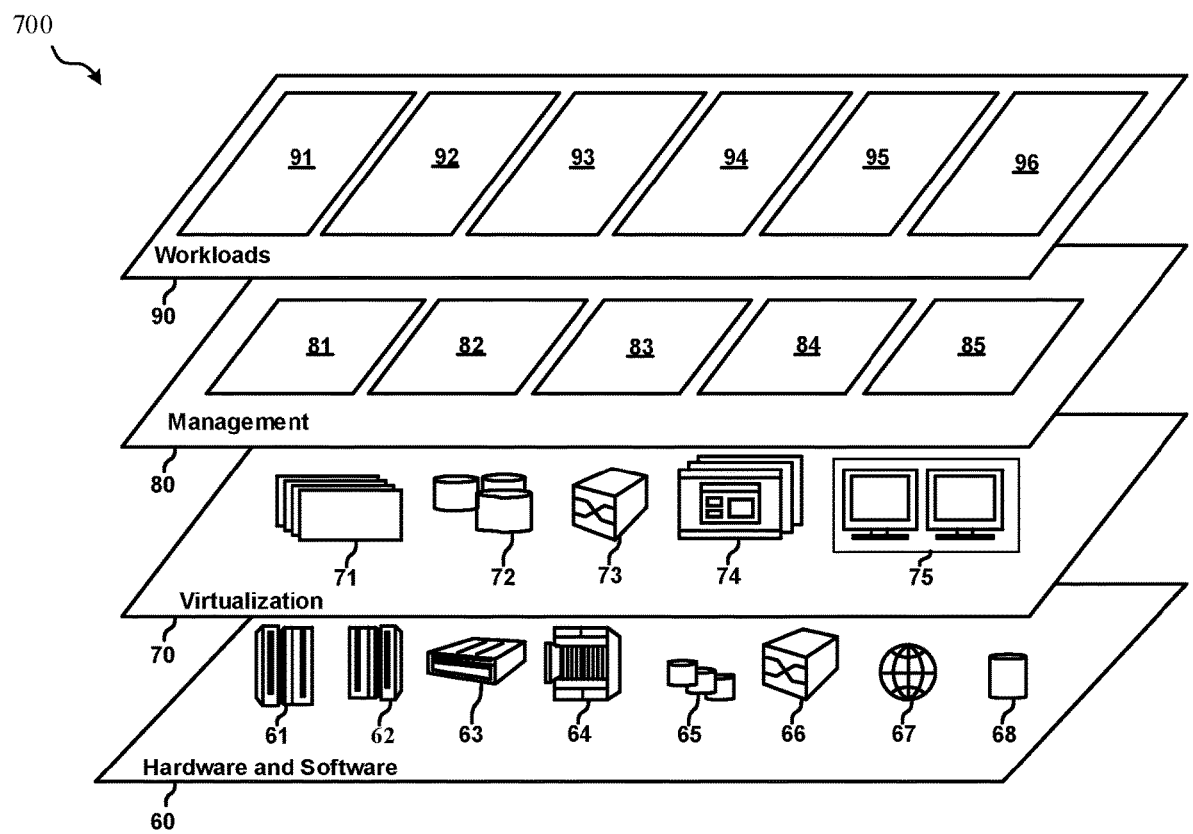
FIG. 7 depicts abstraction model layers, according to some embodiments.

Referring now to FIG. 7, a set of functional abstraction layers 700 provided by cloud computing environment 50 (FIG. 6) is shown, according to some embodiments. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and IT service management 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    identifying deployment characteristics for an operational system based on an architecture of the operational system;
    receiving implementation data regarding past implementations in response to past incident tickets based on the deployment characteristics, wherein the implementation data is used as training data for a machine learning algorithm;
    identifying relationships within the implementation data;
    predicting, using the machine learning algorithm, a volume of new tickets for a first update to the operational system based on the implementation data and the relationships between the implementation data, wherein the implementation data that is similar to present implementation data relating to an existing or upcoming software deployment is used as input data for the machine learning algorithm;
    predicting a resolution time for high severity tickets in the volume of new tickets;
    determining preferred service characteristics based on the volume of the new tickets and the resolution time for the high severity tickets, wherein the preferred service characteristics decrease the resolution time, and wherein determining the preferred service characteristics comprises:
        analyzing service characteristics for past support workers who performed work on similar volumes of tickets to the volume of new tickets through a graphical visual representation showing relationships between a plurality of service characteristics;
    transmitting a recommendation comprising the preferred service characteristics
    detecting an actual volume of new tickets and an actual resolution time for a set of high-severity tickets in the actual volume of new tickets for the update; and
    adding the actual volume of new tickets and the actual resolution time for the set of high-severity tickets, resulting in updated implementation data that may be used to predict a volume of new tickets and a resolution time for high-severity tickets for a second update to the operational system.

2. The method of claim 1, wherein identifying the deployment characteristics for the operational system comprises:
    identifying the architecture for the operational system; and
    determining the deployment characteristics that are specific to the architecture for the operational system.

3. The method of claim 2, wherein:
    the architecture for the operational system is an on-premises architecture; and the determined deployment characteristics comprise at least one of a number of business users, a cyclomatic complexity, an elapsed performance time, and a number of integrations.

4. The method of claim 2, wherein:
the architecture for the operational system is a cloud-based architecture; and
the determined deployment characteristics comprise at least one of a number of business users, number of services, number of containers, code base, number of microservice templates, heterogeneous protocols, number of HTTP operations, deployment operations, static or dynamic forms, number of technical components, message architecture, cloud models, number of integration systems, and number of translations.

5. The method of claim 1, wherein predicting the volume of new tickets comprises:
executing a plurality of regression models to predict the volume of new tickets;
determining a best-fit model from the plurality of regression models;
performing cross-validation on the best-fit model; and
determining whether the best-fit model is over-fit based on the cross-validation.

6. The method of claim 5, further comprising:
calculating a variance inflation factor for each regression model from the plurality of regression models;
calculating an error rate for each regression model; and
comparing the variance inflation factor and the error rate for each regression model.

7. The method of claim 5, further comprising:
in response to determining that the best-fit model is over-fit, determining a second best-fit model from the plurality of regression models.

8. The method of claim 5, further comprising:
in response to determining that the best-fit model is not over-fit, executing the best-fit model as a prediction model.

9. The method of claim 1, wherein the preferred service characteristics comprises at least time, experience, skillset, qualification, and cost of a candidate support worker.

10. The method of claim 1, further comprising:
determining a probability of the high severity tickets from the predicted volume of new tickets.

11. The method of claim 10, wherein determining the preferred service characteristics is further based on the probability of the high severity tickets.

12. A system having one or more computer processors, the system configured to:
identify deployment characteristics for an operational system based on an architecture of the operational system;
receive implementation data regarding past implementations in response to past incident tickets based on the deployment characteristics, wherein the implementation data is used as training data for a machine learning algorithm;
identify relationships within the implementation data;
predict, using the machine learning algorithm, a volume of new tickets for a first update to the operational system based on the implementation data and the relationships between the implementation data, wherein the implementation data that is similar to present implementation data relating to an existing or upcoming software deployment is used as input data for the machine learning algorithm;
predict a resolution time for high severity tickets in the volume of new tickets;
determine preferred service characteristics based on the volume of the new tickets and the resolution time for the high severity tickets, wherein the preferred service characteristics decrease the resolution time, and wherein determining the preferred service characteristics comprises:
analyzing service characteristics for past support workers who performed work on similar volumes of tickets to the volume of new tickets through a graphical visual representation showing relationships between a plurality of service characteristics;
transmit a recommendation comprising the preferred service characteristics
detect an actual volume of new tickets and an actual resolution time for a set of high-severity tickets in the actual volume of new tickets for the update; and
add the actual volume of new tickets and the actual resolution time for the set of high-severity tickets, resulting in updated implementation data that may be used to predict a volume of new tickets and a resolution time for high-severity tickets for a second update to the operational system.

13. The system of claim 12, wherein identifying the deployment characteristics for the operational system comprises:
identifying the architecture for the operational system; and
determining the deployment characteristics that are specific to the architecture for the operational system.

14. The system of claim 13, wherein:
the architecture for the operational system is an on-premises architecture; and
the determined deployment characteristics comprise at least one of a number of business users, a cyclomatic complexity, an elapsed performance time, and a number of integrations.

15. The system of claim 13, wherein:
the architecture for the operational system is a cloud-based architecture; and
the determined deployment characteristics comprise at least one of a number of business users, number of services, number of containers, code base, number of microservice templates, heterogeneous protocols, number of HTTP operations, deployment operations, static or dynamic forms, number of technical components, message architecture, cloud models, number of integration systems, and number of translations.

16. The system of claim 12, wherein predicting the volume of new tickets comprises:
executing a plurality of regression models to predict the volume of new tickets;
determining a best-fit model from the plurality of regression models;
performing cross-validation on the best-fit model; and
determining whether the best-fit model is over-fit based on the cross-validation.

17. A computer program product comprising a computer readable storage medium having program instructions embodied therewith, the program instructions executable by a server to cause the server to perform a method, the method comprising:
identifying deployment characteristics for an operational system based on an architecture of the operational system;

receiving implementation data regarding past implementations in response to past incident tickets based on the deployment characteristics, wherein the implementation data is used as training data for a machine learning algorithm;

identifying relationships within the implementation data;

predicting, using the machine learning algorithm, a volume of new tickets for a first update to the operational system based on the implementation data and the relationships between the implementation data, wherein the implementation data that is similar to present implementation data relating to an existing or upcoming software deployment is used as input data for the machine learning algorithm;

predicting a resolution time for high severity tickets in the volume of new tickets;

determining preferred service characteristics based on the volume of the new tickets and the resolution time for the high severity tickets, wherein the preferred service characteristics decrease the resolution time, and wherein determining the preferred service characteristics comprises:

analyzing service characteristics for past support workers who performed work on similar volumes of tickets to the volume of new tickets through a graphical visual representation showing relationships between a plurality of service characteristics; and transmitting a recommendation comprising the preferred service characteristics detecting an actual volume of new tickets and an actual resolution time for a set of high-severity tickets in the actual volume of new tickets for the update; and adding the actual volume of new tickets and the actual resolution time for the set of high-severity tickets, resulting in updated implementation data that may be used to predict a volume of new tickets and a resolution time for high-severity tickets for a second update to the operational system.

18. The computer program product of claim 17, wherein identifying the deployment characteristics for the operational system comprises:

identifying the architecture for the operational system; and determining the deployment characteristics that are specific to the architecture for the operational system.

19. The computer program product of claim 17, wherein predicting the volume of new tickets comprises:

executing a plurality of regression models to predict the volume of new tickets;

determining a best-fit model from the plurality of regression models;

performing cross-validation on the best-fit model; and determining whether the best-fit model is over-fit based on the cross-validation.

20. The computer program product of claim 19, further comprising:

calculating a variance inflation factor for each regression model from the plurality of regression models;

calculating an error rate for each regression model; and comparing the variance inflation factor and the error rate for each regression model.

\* \* \* \* \*